US010824297B2

(12) United States Patent
Gonnen et al.

(10) Patent No.: US 10,824,297 B2
(45) Date of Patent: Nov. 3, 2020

(54) SYSTEM FOR AND METHOD OF ACCESSING AND SELECTING EMOTICONS, CONTENT, AND MOOD MESSAGES DURING CHAT SESSIONS

(71) Applicant: Google LLC, Mountain View, CA (US)

(72) Inventors: Lior Gonnen, Palo Alto, CA (US); Iddo Tal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 247 days.

(21) Appl. No.: 15/802,442

(22) Filed: Nov. 2, 2017

(65) Prior Publication Data

US 2018/0059885 A1 Mar. 1, 2018

Related U.S. Application Data

(63) Continuation of application No. 14/091,248, filed on Nov. 26, 2013, now abandoned.

(60) Provisional application No. 61/730,038, filed on Nov. 26, 2012.

(51) Int. Cl.
*G06F 3/0482* (2013.01)
*G06F 3/0488* (2013.01)
*H04L 12/58* (2006.01)

(52) U.S. Cl.
CPC ........ *G06F 3/0482* (2013.01); *G06F 3/04883* (2013.01); *G06F 3/04886* (2013.01); *H04L 51/04* (2013.01); *H04L 51/32* (2013.01)

(58) Field of Classification Search
CPC ....... G06F 3/04812; G06F 17/27; H04Q 7/22; G06Q 30/30; H04W 4/00; H04L 51/04; H04L 51/32
See application file for complete search history.

(56) References Cited

U.S. PATENT DOCUMENTS

| 6,614,422 | B1 | 9/2003 | Rafii | |
| 7,035,803 | B1* | 4/2006 | Ostermann | G10L 21/06 704/258 |
| 7,996,775 | B2 | 8/2011 | Cole | |
| 8,610,682 | B1* | 12/2013 | Fulcher | G06F 3/0482 345/173 |
| 8,775,526 | B2 | 7/2014 | Lorch | |
| 9,116,884 | B2* | 8/2015 | Milstein | G06F 17/2872 |
| 9,306,880 | B1 | 4/2016 | Hyndman | |
| 2005/0156947 | A1 | 7/2005 | Sakai | |

(Continued)

OTHER PUBLICATIONS

"Emotion", "library", and "user interface" definition; Microsoft Corp., Microsoft Computer Dictionary, Fifth Edtion, Microsoft Press, Mar. 15, 2002, ISBN-13: 978-07356-1495-6; pp. 241, 391, 684.

*Primary Examiner* — Steven P Sax

(74) *Attorney, Agent, or Firm* — IP Spring

(57) ABSTRACT

Emoticons or other images are inserted into text messages during chat sessions without leaving the chat session by entering an input sequence onto an input area of a touch-screen on an electronic device, thereby causing an emoticon library to be presented to a user. The user selects an emoticon, and the emoticon library either closes automatically or closes after the user enters a closing input sequence. The opening and closing input sequences are, for example, any combination of swipes and taps along or on the input area. Users are also able to add content to chat sessions and generate mood messages to chat sessions.

20 Claims, 16 Drawing Sheets

(56) References Cited

U.S. PATENT DOCUMENTS

| | | |
|---|---|---|
| 2005/0204309 A1 | 9/2005 | Szeto |
| 2006/0015812 A1 | 1/2006 | Cunningham |
| 2006/0200380 A1 | 9/2006 | Ho |
| 2006/0234680 A1* | 10/2006 | Doulton ............... H04L 51/066 455/412.1 |
| 2006/0279559 A1 | 12/2006 | Kongqiao |
| 2007/0033534 A1 | 2/2007 | Kim |
| 2007/0040850 A1* | 2/2007 | Coleman ........... H04M 1/72547 345/629 |
| 2007/0043687 A1 | 2/2007 | Bodart |
| 2007/0177803 A1 | 8/2007 | Elias |
| 2007/0288560 A1 | 12/2007 | Bou-ghannam |
| 2008/0040227 A1* | 2/2008 | Ostermann ............ G06Q 30/02 705/14.67 |
| 2008/0195699 A1 | 8/2008 | Min |
| 2008/0216022 A1 | 9/2008 | Lorch |
| 2008/0316183 A1 | 12/2008 | Westerman |
| 2009/0013048 A1* | 1/2009 | Partaker ................ H04L 67/24 709/206 |
| 2009/0013059 A1* | 1/2009 | Partaker ............. H04L 65/1096 709/217 |
| 2009/0013265 A1* | 1/2009 | Cole ....................... H04L 51/04 715/758 |
| 2009/0030800 A1 | 1/2009 | Grois |
| 2009/0061825 A1* | 3/2009 | Neelakantan ..... H04L 29/12292 455/412.1 |
| 2009/0063992 A1 | 3/2009 | Gandhi |
| 2009/0106825 A1 | 4/2009 | Cerruti |
| 2009/0228825 A1 | 9/2009 | Van Os |
| 2009/0325603 A1 | 12/2009 | Van Os |
| 2010/0123724 A1 | 5/2010 | Moore |
| 2010/0125785 A1 | 5/2010 | Moore |
| 2010/0133338 A1* | 6/2010 | Brown ................ G06K 9/00026 235/382 |
| 2010/0159883 A1* | 6/2010 | Pascal ............... G06F 16/24578 455/412.1 |
| 2010/0162133 A1 | 6/2010 | Pascal |
| 2010/0162138 A1 | 6/2010 | Pascal |
| 2010/0179991 A1 | 7/2010 | Lorch |
| 2010/0293473 A1 | 11/2010 | Borst |
| 2011/0055735 A1 | 3/2011 | Wood |
| 2011/0078567 A1 | 3/2011 | Kim |
| 2011/0214055 A1 | 9/2011 | Georgiev |
| 2011/0285631 A1 | 11/2011 | Imamura |
| 2011/0285656 A1* | 11/2011 | Yaksick ............... G06F 3/04883 345/173 |
| 2011/0289428 A1 | 11/2011 | Yuen |
| 2011/0302519 A1 | 12/2011 | Fleizach |
| 2012/0019446 A1* | 1/2012 | Wu ....................... G06F 3/0237 345/168 |
| 2012/0021785 A1 | 1/2012 | Weinrib |
| 2012/0047447 A1* | 2/2012 | Haq ..................... G06F 3/04847 715/752 |
| 2012/0060103 A1 | 3/2012 | Arasaki |
| 2012/0209863 A1* | 8/2012 | Hidesawa ............. G06Q 10/10 707/755 |
| 2012/0242582 A1 | 9/2012 | Choi |
| 2013/0024781 A1 | 1/2013 | Douillet |
| 2013/0046544 A1 | 2/2013 | Kay |
| 2013/0073556 A1 | 3/2013 | Valeski |
| 2013/0097526 A1 | 4/2013 | Stovicek |
| 2013/0120271 A1* | 5/2013 | Lee ....................... G06F 3/0482 345/168 |
| 2013/0159919 A1* | 6/2013 | Leydon ................... H04W 4/18 715/780 |
| 2013/0285926 A1 | 10/2013 | Griffin |
| 2013/0318466 A1 | 11/2013 | Estrada |
| 2014/0013271 A1* | 1/2014 | Moore ................ G06F 3/04886 715/792 |
| 2014/0032206 A1* | 1/2014 | Grieves ................. G06F 40/274 704/9 |
| 2014/0088954 A1* | 3/2014 | Shirzadi ................ G06F 40/166 704/9 |
| 2014/0101553 A1 | 4/2014 | Nagel |
| 2014/0195605 A1 | 7/2014 | Kallayil |
| 2015/0127453 A1 | 5/2015 | Tew |
| 2015/0135137 A1 | 5/2015 | Miwa |
| 2015/0178782 A1* | 6/2015 | Kim ................... G06Q 30/0267 705/14.64 |
| 2018/0335930 A1* | 11/2018 | Scapel .................... H04L 51/10 |
| 2018/0336715 A1* | 11/2018 | Rickwald ........... G06K 9/00315 |
| 2018/0364898 A1* | 12/2018 | Chen .................... G06F 3/0483 |
| 2019/0124021 A1* | 4/2019 | DeMattei ............. G06F 3/0488 |
| 2019/0332247 A1* | 10/2019 | Liu ....................... G06F 3/0482 |

* cited by examiner

SYSTEM FOR AND METHOD OF ACCESSING AND SELECTING EMOTICONS, CONTENT, AND MOOD MESSAGES DURING CHAT SESSIONS

CROSS REFERENCE TO RELATED APPLICATIONS

This patent application is a continuation of U.S. patent application Ser. No. 14/091,248, filed Nov. 26, 2013, which claims the benefit of U.S. Provisional Application No. 61/730,038, filed Nov. 26, 2012, both of which are incorporated by reference herein in their entirety for all purposes.

FIELD OF THE INVENTION

This invention is related to electronic messaging. More particularly, this invention is related to inserting graphical elements into text messages.

BACKGROUND OF THE INVENTION

Today, users typing text messages on touch-screen devices commonly use emoticons (e.g., emoji, smileys, animations, or visuals) to enliven the messages, making the messages more personal, enriching them with feeling. A user must go through several steps to access emoticons before inserting them into the text. For example, a user navigates to the location in the text where she wants to insert an emoticon. Once at the location, she taps a button on her keyboard, taking her away from the text field (typing box) on her keyboard, away from an ongoing chat session and anything else she might be viewing at the time. She may then have to enter a complex sequence of commands to return to the screen she was previously viewing. All of these steps discourage users from using emoticons, decreasing the enjoyment of texting.

SUMMARY OF THE INVENTION

In a first aspect, a method of inserting images into a text message on an electronic device includes presenting a library of images to a user on the electronic device during a chat session without leaving the chat session and inserting a selected image from the library of images into the text message. In one embodiment, the library of images is presented in response to user input entered on the electronic device, such as a swipe, a tap, or any combination thereof on a touchscreen surface of the electronic device. Preferably, the images comprise emoticons. In one embodiment, the method also includes receiving user input, such as swiping or tapping, on the electronic device and, in response, displaying a list of content to insert within the chat session. As one example, the content includes rich media.

In another embodiment, the method also includes receiving user input, such as swiping or tapping, on the electronic device and, in response, modifying options or settings on the chat session. In yet another embodiment, the method also includes embedding user text in the chat session within a mood message.

In one embodiment, the electronic device is a wireless device, such as a smartphone, a mobile telephone, a personal digital assistant, an iPad®, a smart watch, smart glasses, or any other handheld device. In other embodiments, the electronic device is a personal computer, a laptop computer, or a desktop computer.

In a second aspect, an electronic device includes a processor, a memory storing a plurality of images in an image library, and logic configured (e.g., programmed) to receive user input that selects an image from the plurality of images during a chat session and inserts the selected image into a text message during the chat session. In one embodiment, the images are emoticons. Preferably, the electronic device includes a touchscreen for receiving the user input, such as swiping or tapping.

In different embodiments, the logic is also configured to display a list of content and insert content selected from the list into a chat session, modify options or settings in the chat session messaging client, add "mood" graphics to text messages to create mood messages, or any combination of these elements.

Examples of the electronic device include a smartphone, a mobile phone, a laptop computer, a desktop computer, a tablet, a smart watch, or smart glasses. In one embodiment, the logic comprises a widget for executing an application for selecting and inserting the images.

BRIEF DESCRIPTION OF THE DRAWINGS

In all the figures, identical labels refer to the same or a similar element.

DETAILED DESCRIPTION OF THE DRAWINGS

In accordance with the principles of the invention, emoticons and other images are easily inserted into a chat session or other texting application. During a chat session, for example, a user inputs pre-determined gestures on an electronic device, causing an emoticon library (selector) to appear on the device. As some examples, the electronic device has a touch screen, and the gestures are swiping motions, taps, or some combination of these. Preferably, the emoticon library does not entirely obscure the chat session, but instead allows the user to view a portion of the chat session. Preferably, once the user selects an emoticon from the emoticon library, the emoticon library is automatically closed. Alternatively, the user enters a pre-determined sequence of gestures to close the emoticon library. Preferably, the user is able to configure the system to set the pre-determined gestures for opening (e.g., presenting or displaying) and closing (removing from view) the emoticon library, the location of the emoticon library when opened, and the replacement of one emoticon with another, to name only a few configuration parameters.

Figure 1:
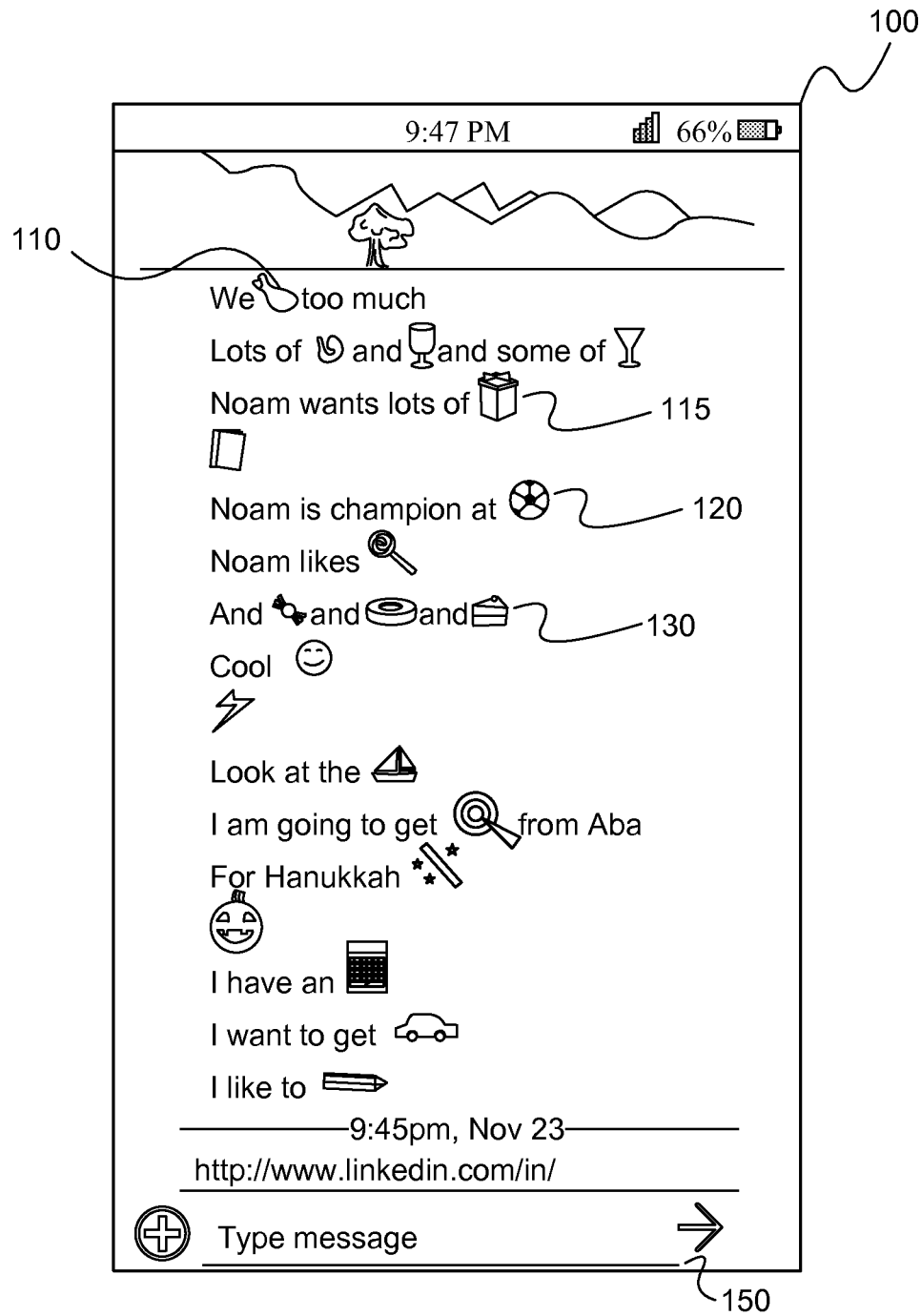
FIG. 1 shows a screenshot of a chat session executing on a device, with emoticons embedded in accordance with one embodiment of the invention.

FIG. 1 shows a screenshot 100 of a chat session executing on an electronic device with emoticons 110, 115, 120, 130 embedded within the text of the chat session in accordance with the principles of the invention. The screenshot 100 also shows a touchscreen text input area 150.

Adding Emoticons to Chat Sessions

Figure 2:
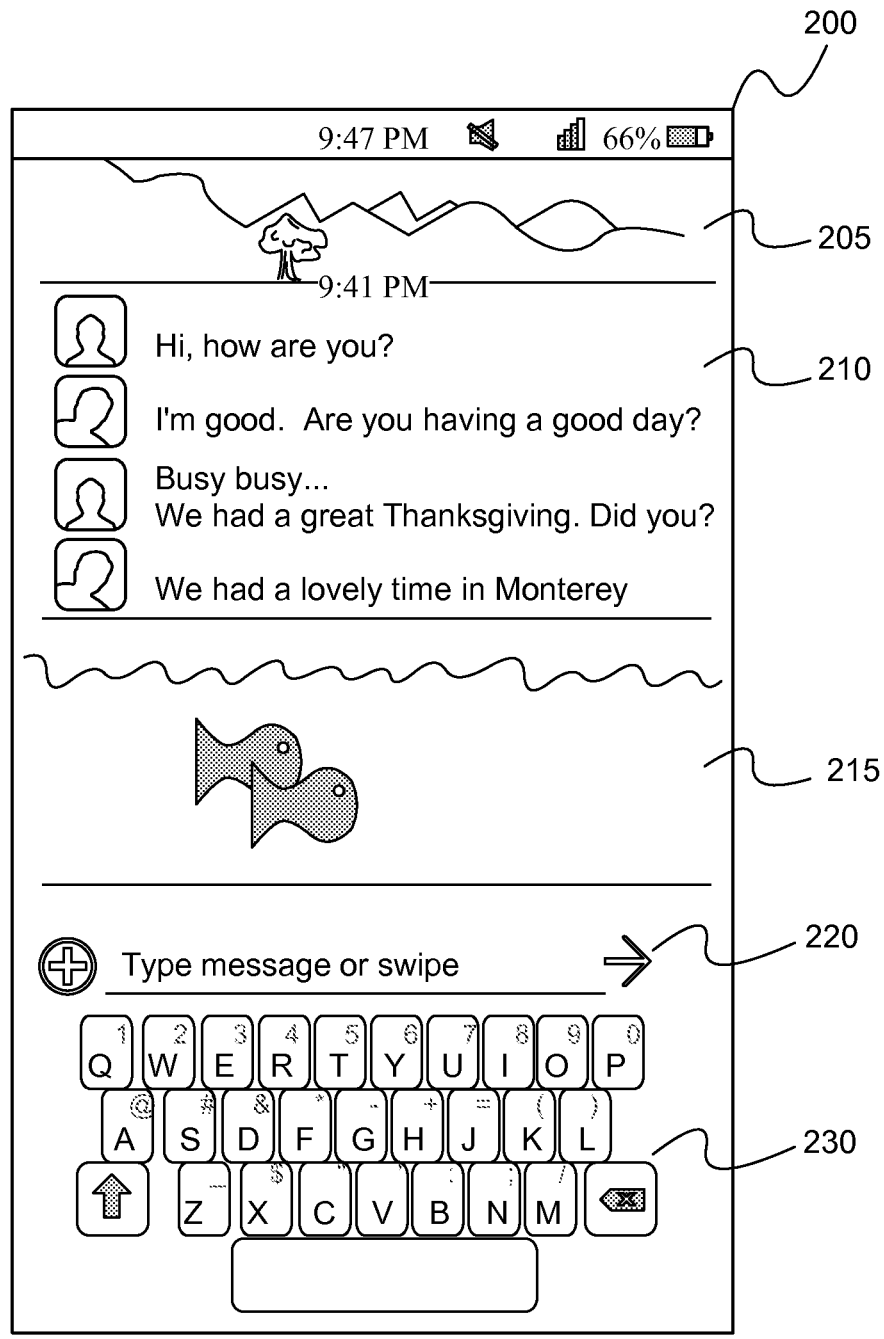
FIG. 2 shows a screenshot of a chat session executing on an electronic device, before a user triggers the presentation of an emoticon library in accordance with one embodiment of the invention.

FIGS. 2-5 illustrate how emoticons are selected and inserted into a chat session, such as shown in FIG. 1, in accordance with the principles of the invention. FIG. 2 shows a screenshot 200 of a chat session executing on an electronic device in accordance with one embodiment of the invention. The electronic device has a touchscreen for viewing information and receiving user inputs. The screenshot 200 shows a texting area 210 for viewing text messages between the user and others, a touchscreen input area 220, and a touchscreen keyboard 230.

In one embodiment, the emoticon application program is an "embedded widget," which appears to the user as an application executed within the texting application, such that both applications appear to be executing simultaneously. In one embodiment, the emoticon application program causes an emoticon library to be displayed on an electronic device during a chat session, an emoticon to be selected, and the selected emoticon to be embedded with a text message of the chat session.

Figure 3:
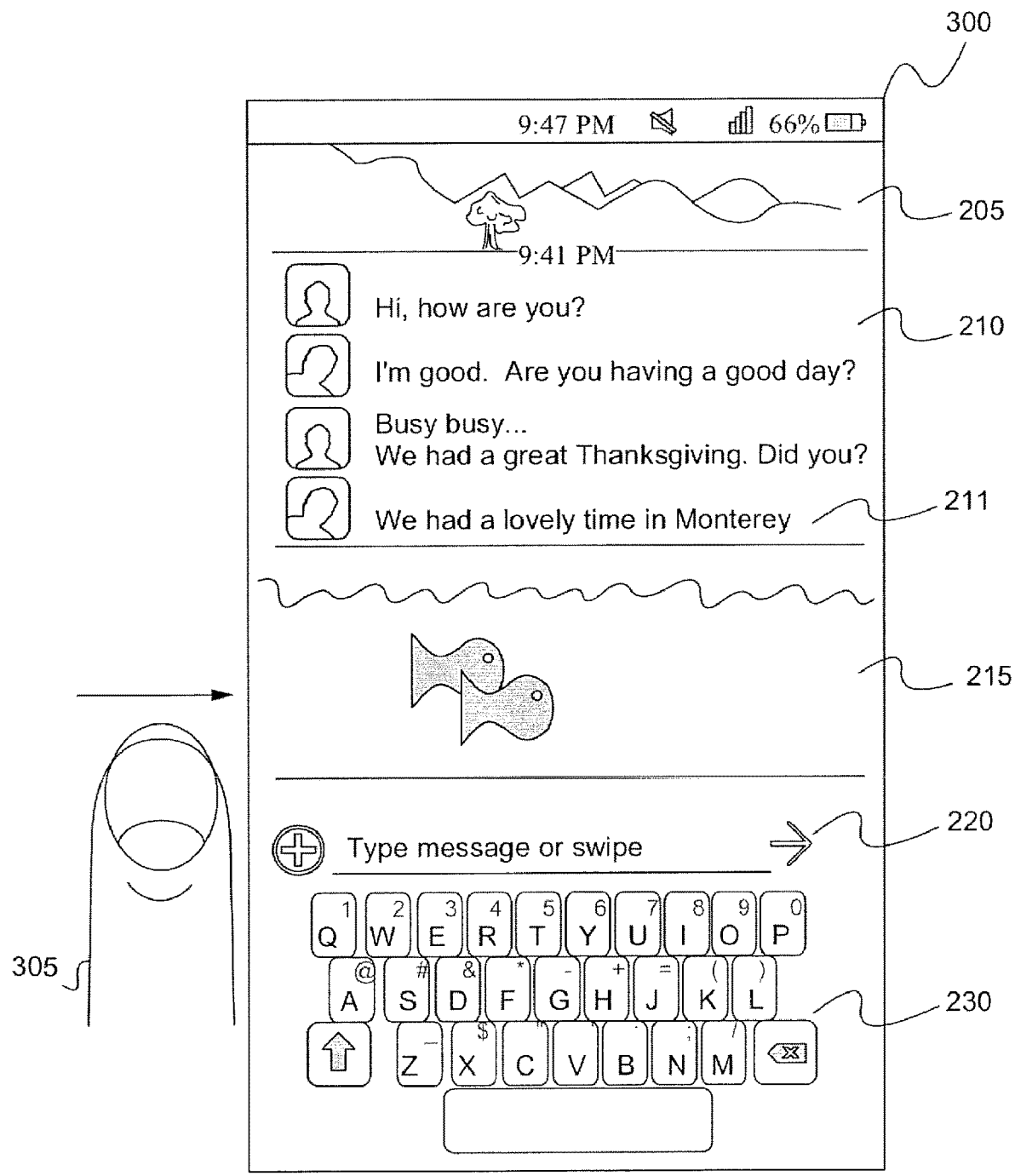
FIG. 3 shows a screenshot on the device of FIG. 2, with a finger swiping from left to right to trigger the presentation of an emoticon library in accordance with one embodiment of the invention.

FIG. 3 shows a screenshot 300 on the electronic device before a user swipes her finger 305 in a left-to-right direction along the input area 220 to trigger presenting an emoticon library on the electronic device. In the screenshot 300, the cursor is currently at the location 211. After the user swipes her finger in a left-to-right direction along the input area 220, an emoticon library 250 containing the emoticon 251A is presented, as shown in the screenshot 400A in FIG. 4A.

In other embodiments, the emoticon library 250 is able to be presented in different configurations and displayed in different locations on the electronic device. As only one example, shown in the screenshot 400B in FIG. 4B, after the user swipes her finger in a left-to-right-direction along the input area 220, the emoticon library 250 is displayed over the keyboard 230, thereby partially or completely obscuring the keyboard 230.

Once the emoticon library 250 is displayed (e.g., FIG. 4A or 4B), the user is now able to select an emoticon from the emoticon library 250 for insertion at the location 211 during the chat session. In this example, the user has selected the emoticon 251 by tapping it. In one embodiment, after an emoticon is selected, the emoticon library 250 is automatically closed. In another embodiment, the emoticon library 250 is closed when the user swipes her finger in a right-to-left direction along the input area 220. As discussed in more detail below, the user is able to configure what user input (e.g., gestures) will open and close the emoticon library 250.

Figure 5:
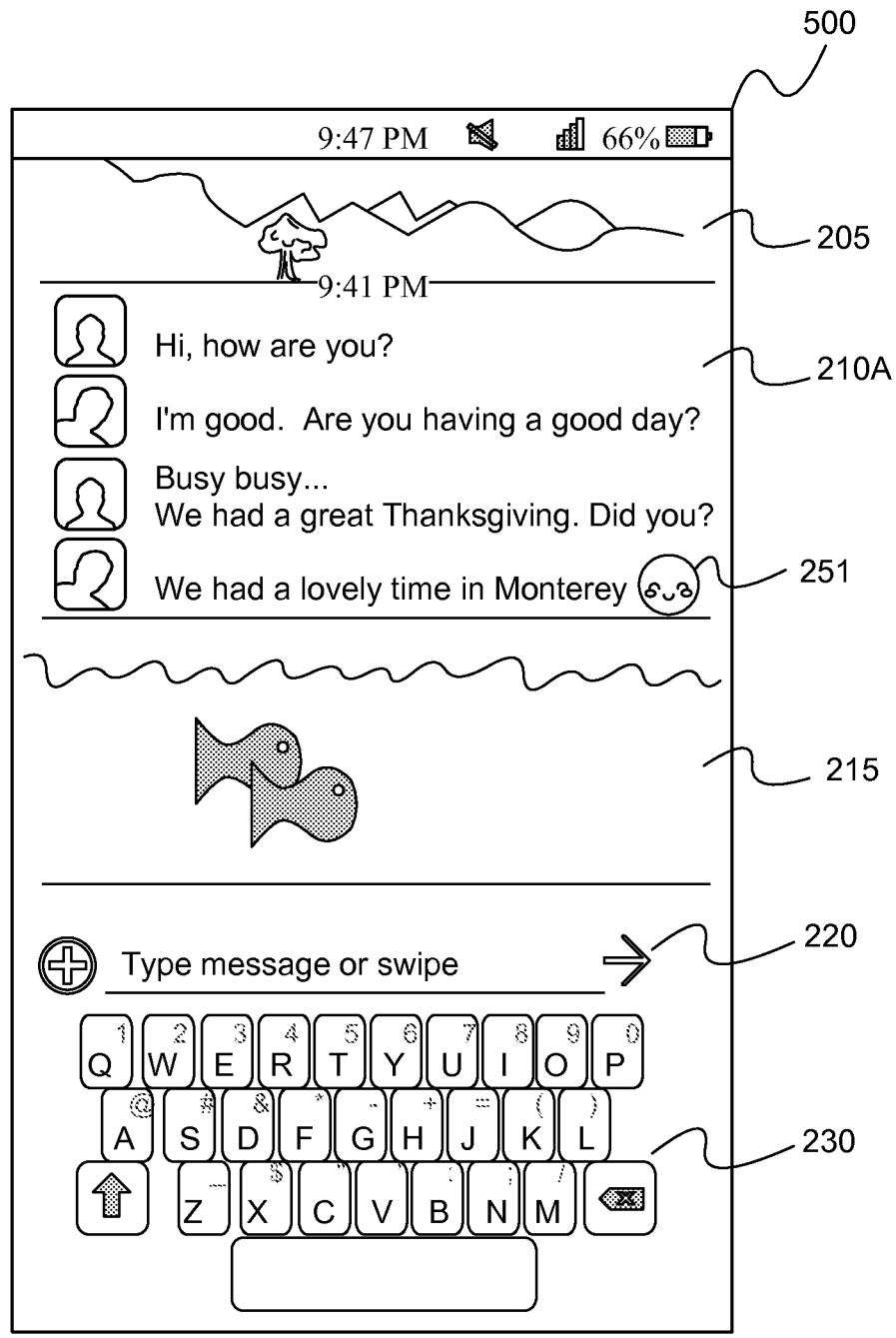
FIG. 5 shows a screenshot 500 on the device of FIG. 2, after a user has selected an emoticon from the emoticon library in accordance with one embodiment of the invention.

FIG. 5 shows a screenshot of the chat session 200 with the texting area 201A after the emoticon 251 has been selected from the emoticon library and automatically inserted into the chat session, and the emoticon library 250 has closed. The label 210A reflects that the area 210 has changed to include the emoticon 251.

While the examples above describe swiping left-to-right along the input area 220 to open the emoticon library 250 and swiping right-to-left along the input area 220 to close the emoticon library 250, it will be appreciated that these are only illustrative ways to open and close the emoticon library 250 during a chat session. An electronic device in accordance with the principles of the invention is able to be configured to open and close an emoticon library in response to other user inputs, such as swiping from left-to-right on the input area 220 to open the emoticon library 250 and then swiping again from left-to-right to close the emoticon library 250; tapping once on the input area 220 to open the emoticon library 250 and tapping a second time on the input area 220 to close the emoticon library 250; tapping once on the input area 220 to open the emoticon library 250 and tapping twice on the input area 220 to close the emoticon library 250; tapping once on the input area 220 to open the emoticon library 250 and swiping in any direction on the input area 220 to close the emoticon library 250; or using any other predetermined sequence of swiping or tapping to open the emoticon library 250 and, after selection of an emoticon, automatically closing the emoticon library 250.

Figure 4A:
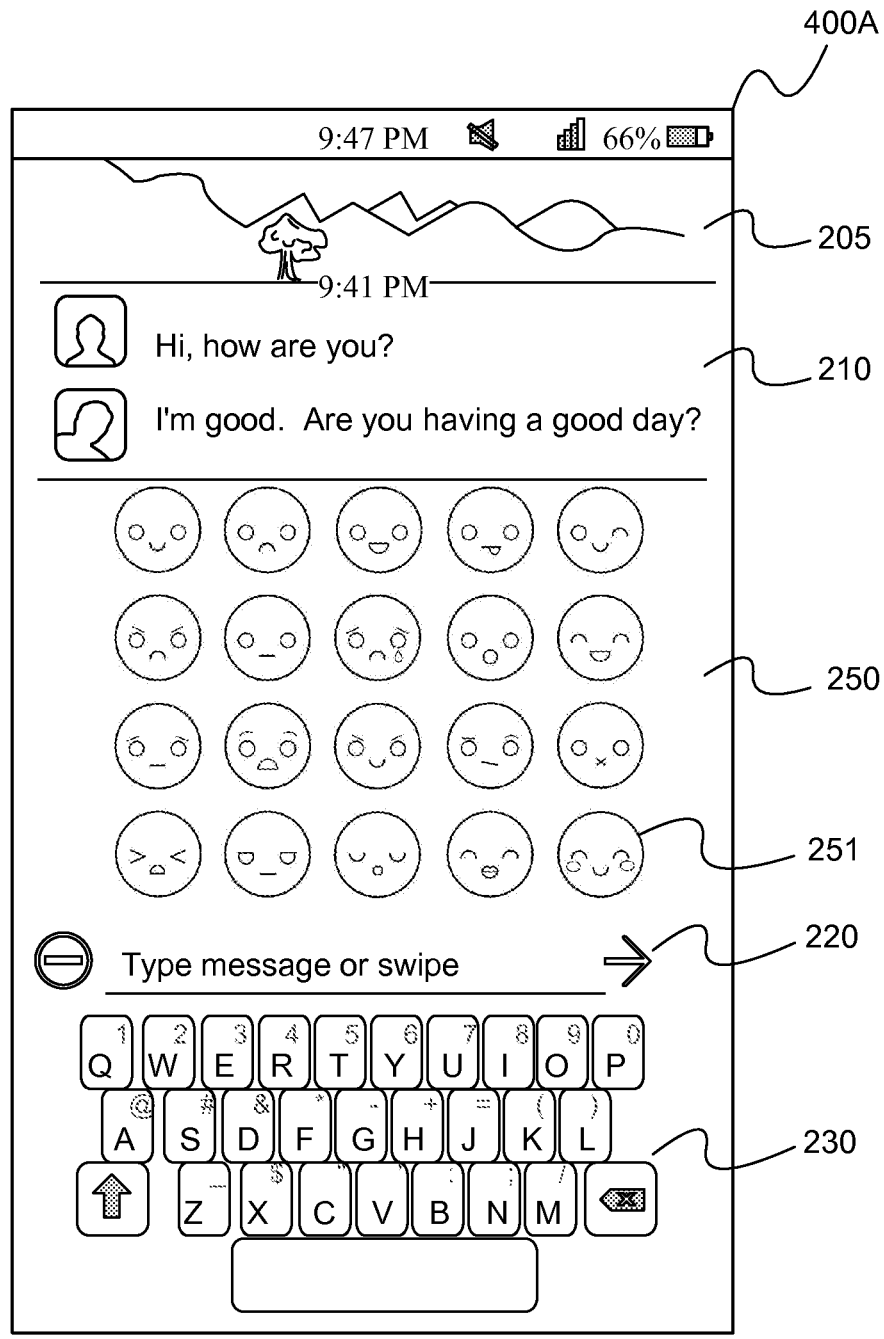
FIGS. 4A and 4B show screenshots on the device of FIG. 2, with an emoticon library presented to the user in accordance with different embodiments of the invention.
Figure 4B:
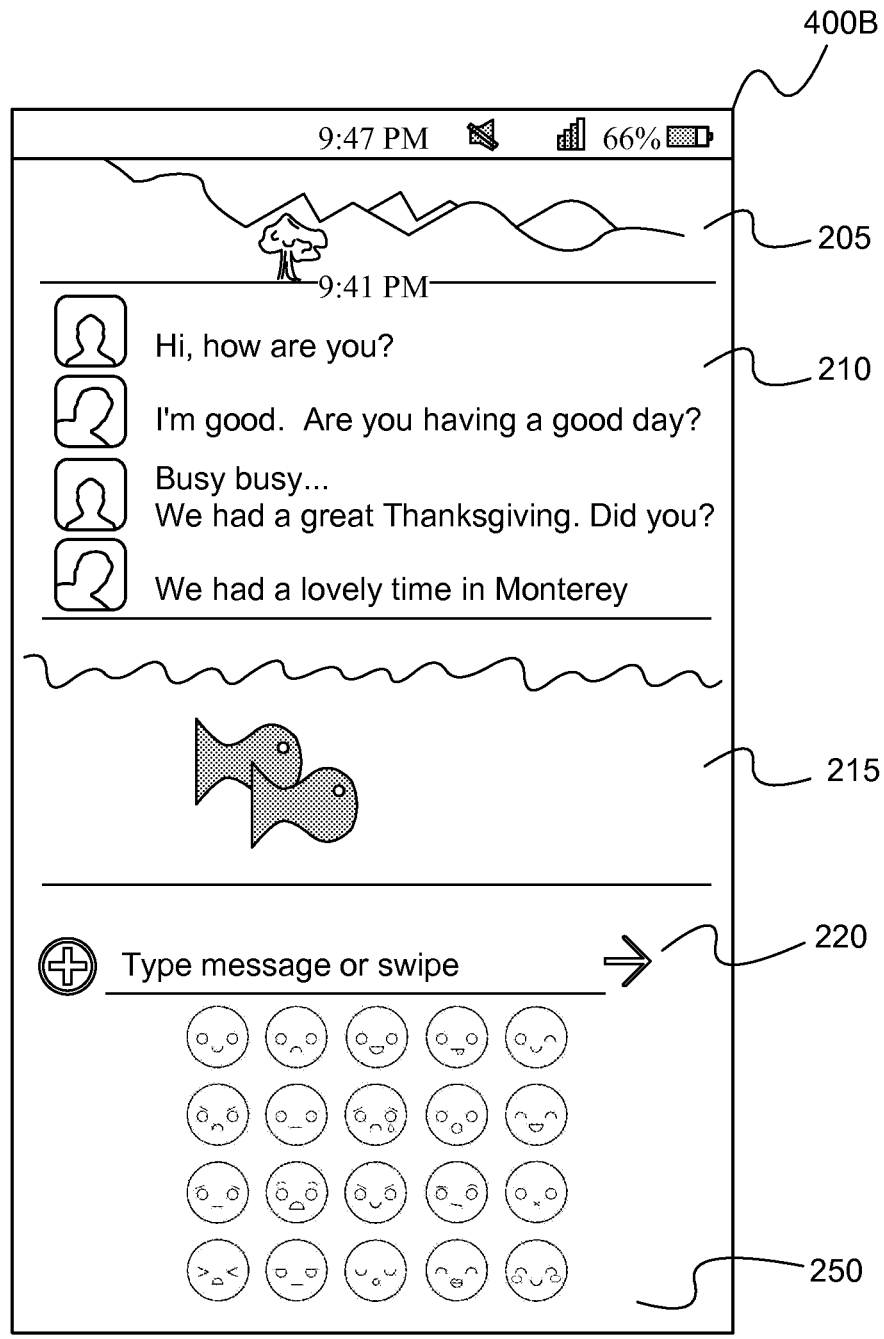
Figure 6:
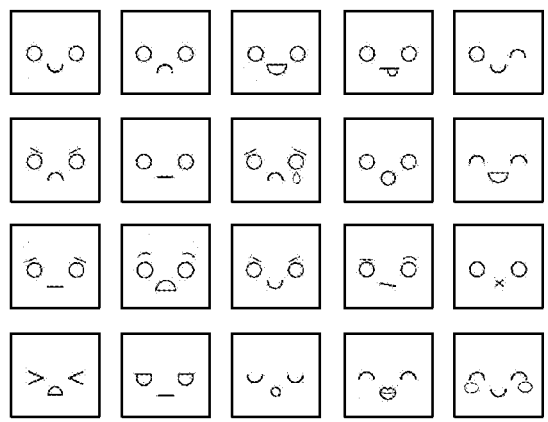
FIGS. 6 and 7 show examples of other emoticon libraries that are able to be inserted into text messages in accordance with different embodiments of the invention.
Figure 7:

It will be appreciated that the emoticon library 250 in FIGS. 4A and 4B is merely illustrative. Other emoticon libraries are able to be used in accordance with the principles of the invention. FIGS. 6 and 7 are examples of other emoticon libraries 600 and 700, respectively, that are able to be used in accordance with the principles of the invention.

Adding Content to Chat Sessions

In one embodiment, in response to any gesture (e.g., a typing, a swipe, or a tapping), a user is presented with a list of options from which they are able to choose. For example, in response to a gesture, a user is presented with any content, such as rich media, to be added to the chat session. Examples of rich media include pictures, video, text designs, and "push-to-talk" links, to name only a few such examples. Users are also able to swipe, type, tap, double-tap, etc. to be presented with options that allow them to modify other options or settings in their texting messaging client, such as described in U.S. patent application Ser. No. 14/079,957, titled "Embedding Rich Media Into Text Messages," filed Nov. 14, 2013, which is hereby incorporated by reference in its entirety.

Figure 8A:
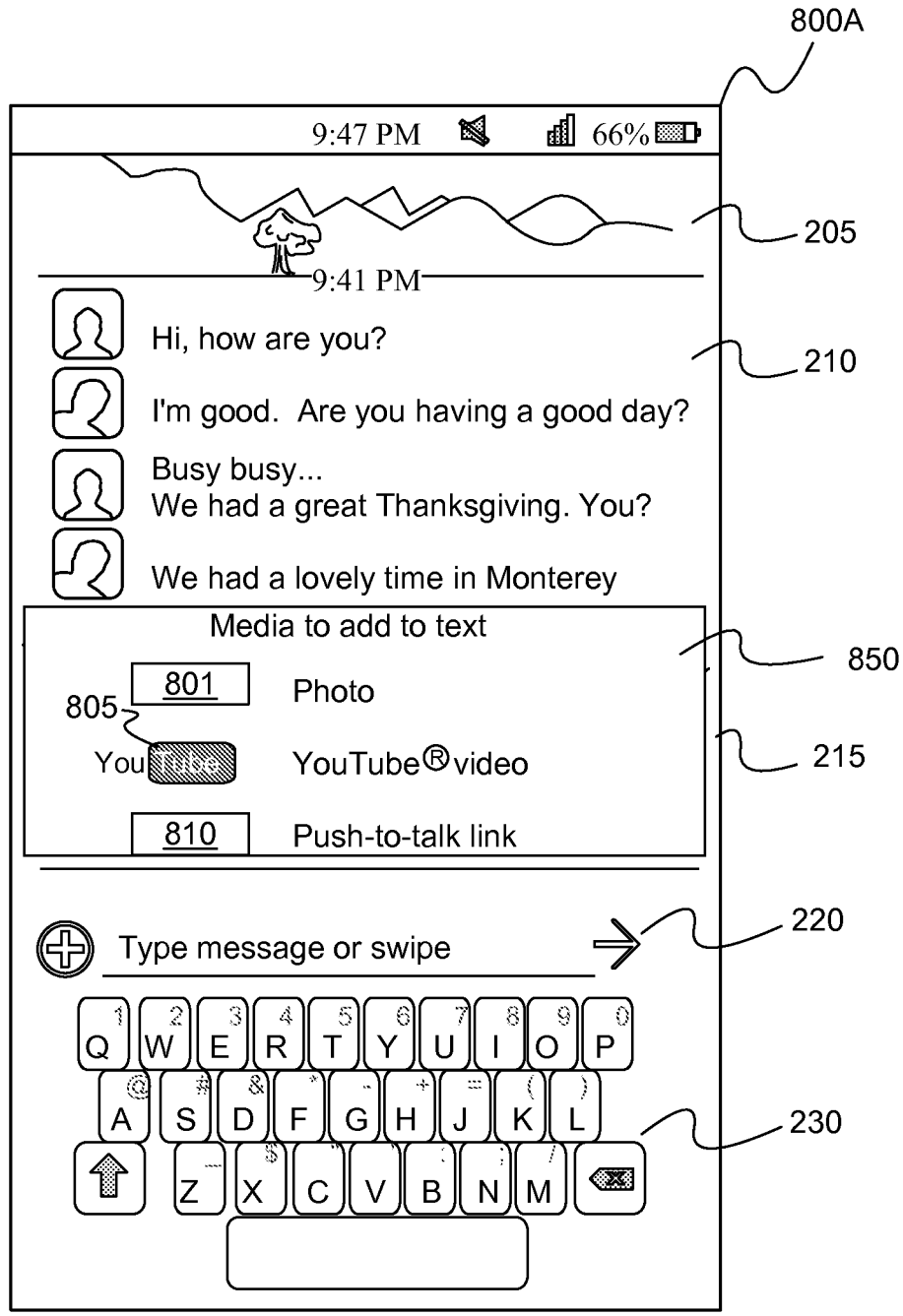
FIGS. 8A and 8B show screenshots on the device of FIG. 2, after a user has entered input on the electronic device to trigger displaying a list of content to enter into the chat session in accordance with different embodiments of the invention.
Figure 8B:
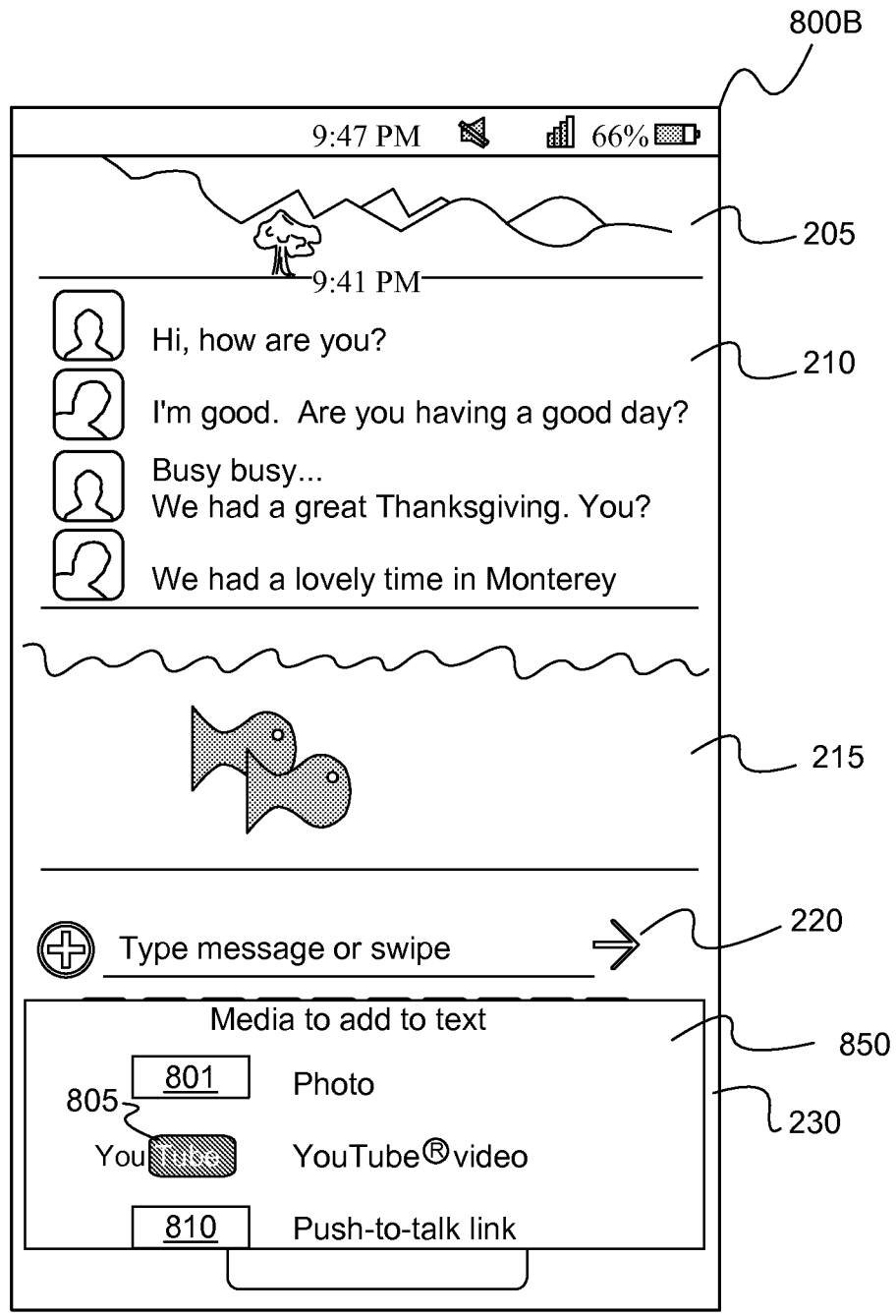

FIG. 8A, for example, shows a screen shot 800A of the electronic device of FIG. 2 after a user has input a predetermined gesture on the input area 220, such as described herein, causing a pane 850 containing a list of media, a photo 801, a YouTube® video 805, and a Push-to-talk link 810, to overlay the area 215 during the chat session. In an alternative embodiment, shown in the screenshot 800B of FIG. 8B, the pane 850 overlays the keyboard 230. A user is now able to select media from the list of media to be included within the chat session. It will be appreciated that FIGS. 8A and 8B are merely illustrative. In other embodiments, the list of content is presented in other formats (e.g., other than as a pane) and is displayed in other ways, such as by partially overlaying (obscuring) other elements on a touchscreen or other display.

Figure 9:
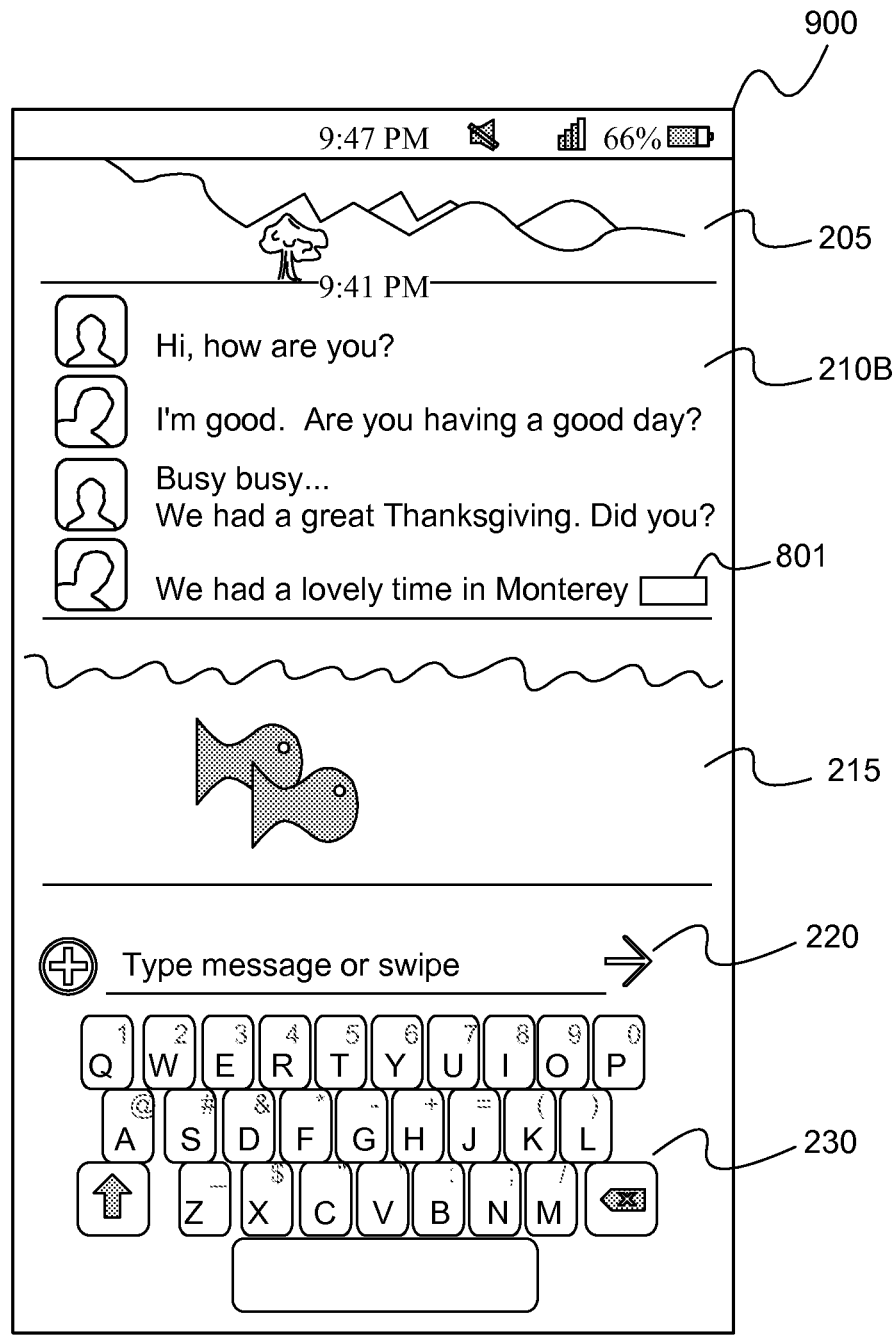
FIG. 9 shows a screenshot on the device of FIG. 2, after a user has selected content from the list of content in FIG. 8A in accordance with one embodiment of the invention.

FIG. 9 shows a screenshot 900 of the chat session after the media 801 has been selected, such as by tapping on an icon of the media 801. As shown in FIG. 9, once selected, the media 810 is embedded within the chat session.

Adding Mood Messages to Chat Sessions

In yet another embodiment, text messages are enhanced by mood messages. For example, when a user types a message, such as "Happy Birthday Tim!" into the text field, she has the option to visually enhance the message through mood messages. The user also has the option to navigate to mood messages before typing any text. Once the user has selected the option to create a mood message, she is able to choose from many different graphic templates. For example, there may be a template of a colorful banner and the text that they have types (e.g., "Happy Birthday Tim!") will be displayed within the designed mood message, in this case, the banner. The user is now able to send the banner directly to a recipient or the user is able navigate to other mood message templates, where the text that they have already types is presented within other design. As some examples, mood messages in accordance with embodiments of the invention are static, animated, or contain media from other photos or videos.

Figure 10:
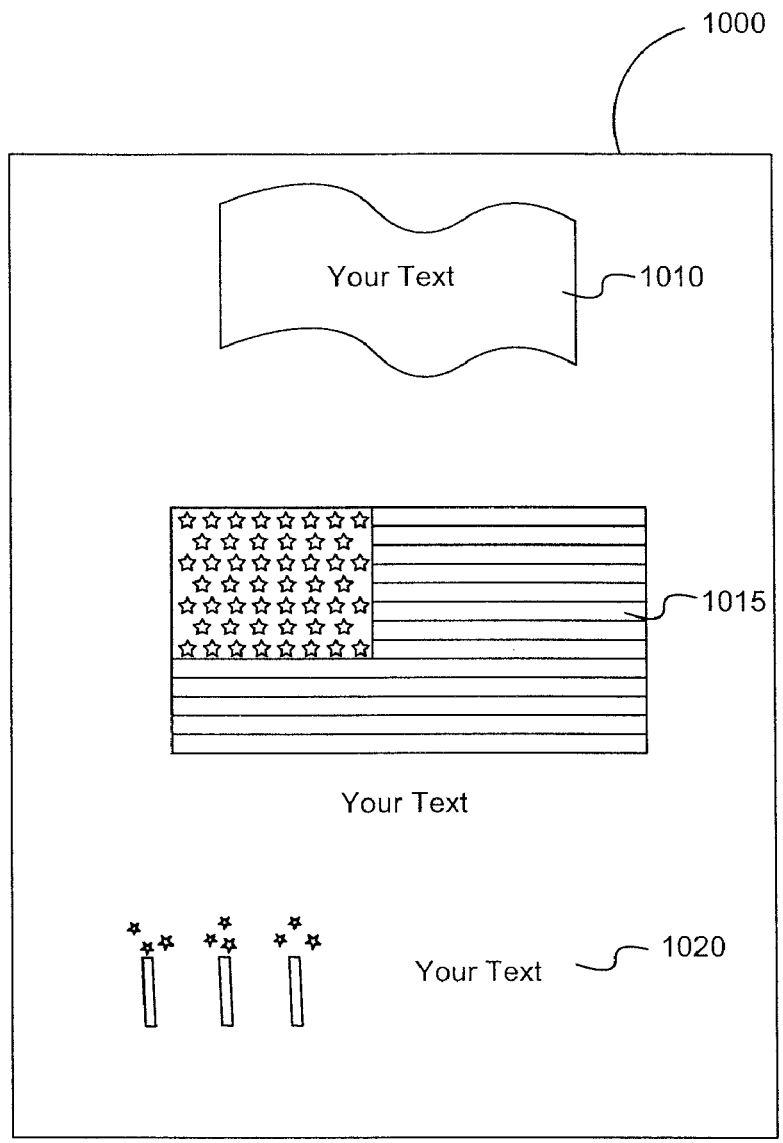
FIG. 10 shows a screenshot on the device of FIG. 2, after a user has entered input on the electronic device to trigger displaying a list of banners for embedding text in the chat session in accordance with one embodiment of the invention.
Figure 11:
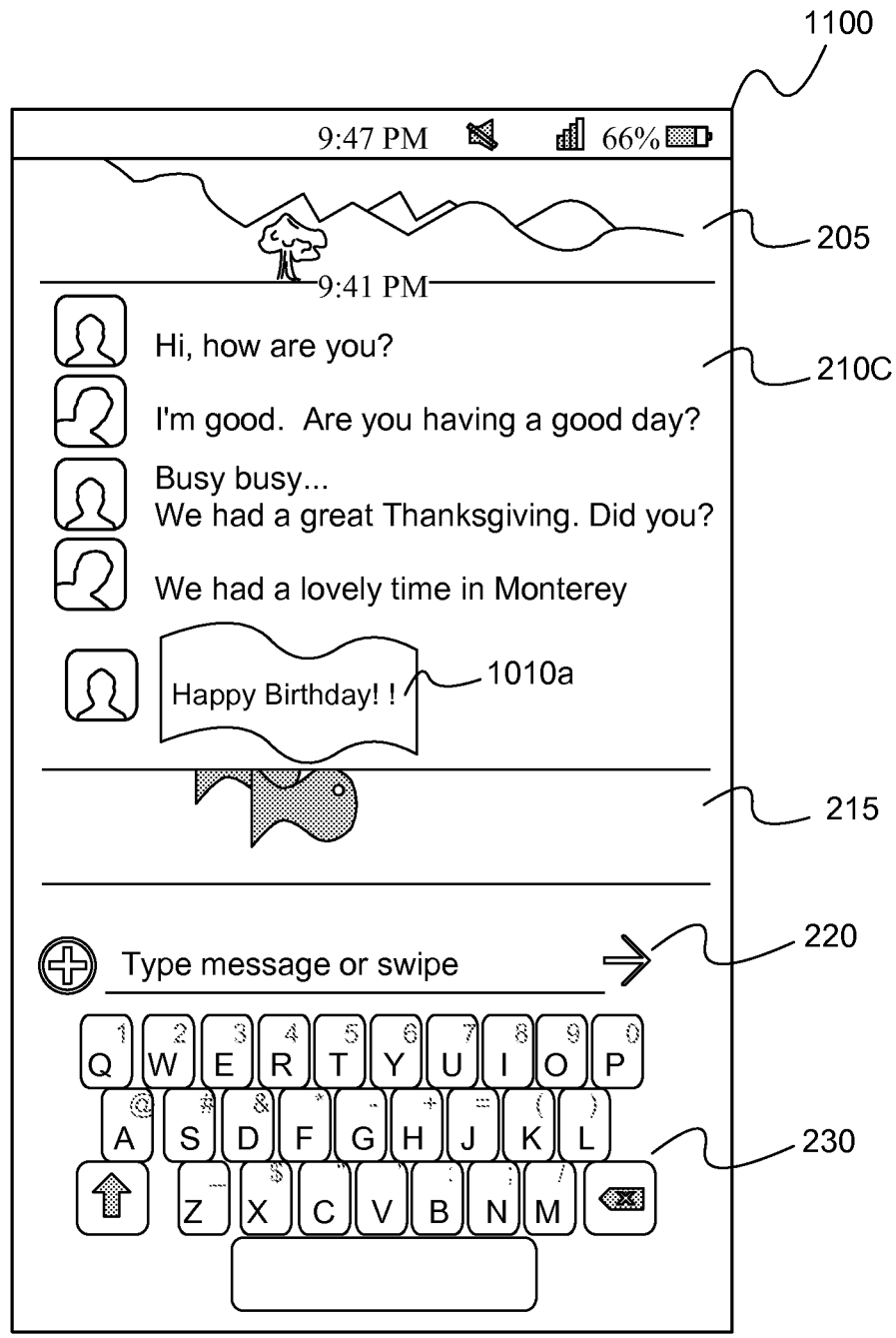
FIG. 11 shows a screenshot on the device of FIG. 2, after a user has selected a banner from the list in FIG. 10 in accordance with one embodiment of the invention.

FIG. 10, for example shows a list of banners 1000 displayed on electronic device during a chat session after a user has entered a pre-determined gesture on the input area 220, such as described herein. The list of banners 1000 includes banners 1010, 1015, and 1020, all indicating where the user's text will be displayed within the banner. FIG. 11 shows a screenshot 1100 of the chat session after the banner 1010 has been selected and the user entered the text "Happy Birthday!" The banner 1010 is able to be selected in any way, such as by tapping on an icon of the banner 1010. As shown in FIG. 11, once the banner 1010 is selected and the text entered, the entry 1010A is entered within the chat session. It will be appreciated that while this examples describes a user selecting a banner first and then entering text, the steps are able to be performed in any sequence.

Configuring a System

Figure 12:
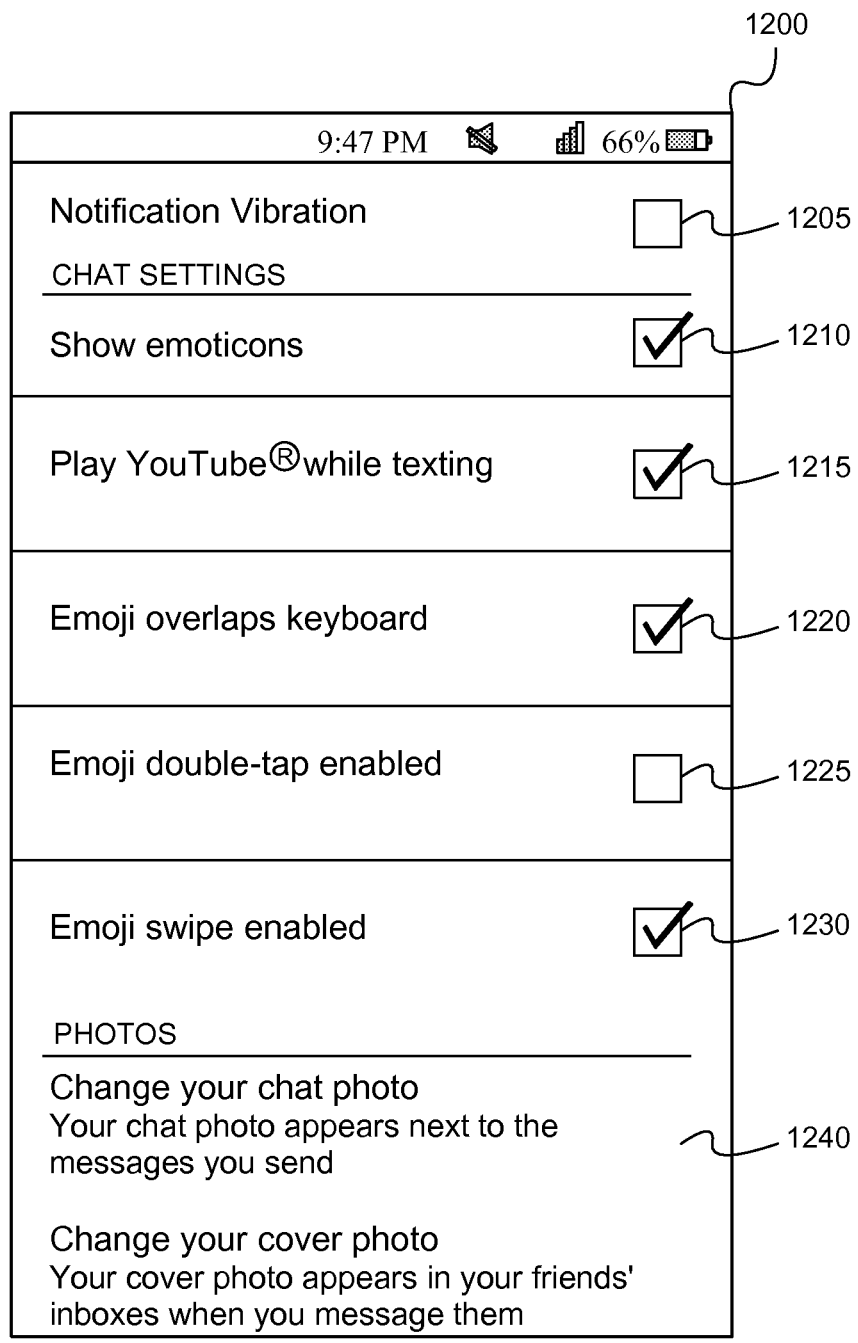
FIG. 12 shows a screenshot on the device of FIG. 2, showing a configuration screen for setting parameters related to, among other things, presenting an emoticon library on the device in accordance with one embodiment of the invention.

FIG. 12 shows a screenshot of a configuration screen 1200 for configuring an electronic device in accordance with one embodiment of the invention. As shown by the check boxes in the screen 1200, an electronic device is configured to vibrate when a text invitation is received on it (unchecked box 1205), to replace smiley text with smiley icons (checked box 1210), to play a YouTube® video while inside a texting application (checked box 1215), to show an Emoji™ emoticon library below the text area overlapping a keyboard (checked box 1220), to not show an Emoji™ emoticon library when the text input area (e.g., element 220 in FIG. 2) is double tapped (unchecked box 1225), and to show the Emoji™ library when the text input area is swiped (checked box 1230). The configuration screen 1200 also shows an area for changing a chat photo to appear next to the messages that the user sends, and to change a cover photo so that it appears in the inboxes of the user's friends when the user texts them. Playing YouTube® or other rich media while texting is disclosed in U.S. patent application Ser. No. 14/079,957, titled "Embedding Rich Media Into Text Messages," filed Nov. 14, 2013, incorporated by reference above.

Figure 13:
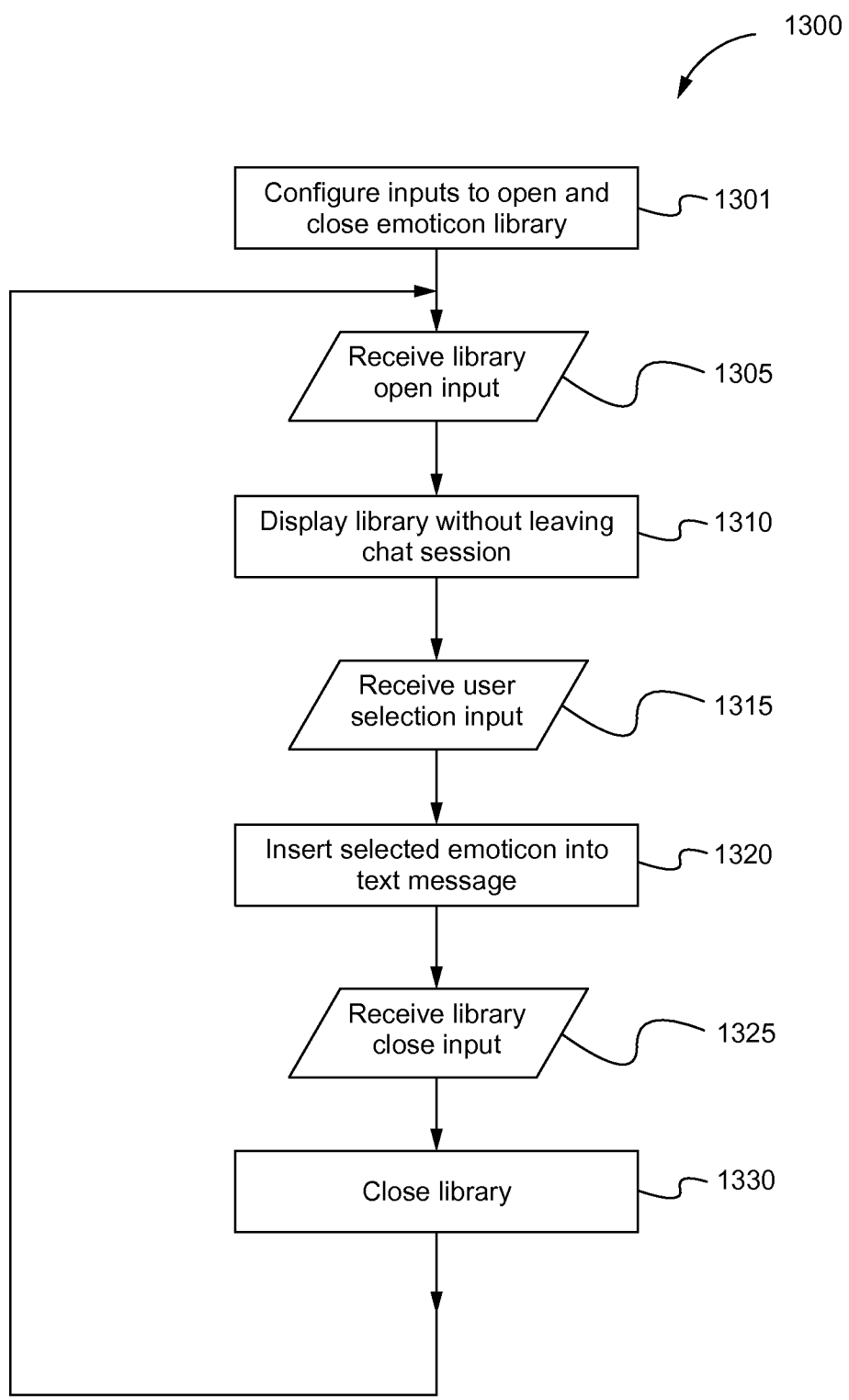
FIG. 13 shows the steps of a process for inserting emoticons into text messages during a chat session in accordance with one embodiment of the invention.

FIG. 13 shows the steps 1300 of a process for inserting emoticons in text messages during a chat session executing on an electronic device in accordance with one embodiment of the invention. In the step 1301, the electronic device is configured, such as by checking and unchecking boxes in the configuration screen 1200. Next, in the step 1305, the electronic device receives a "library open" user input (e.g., gesture), such as by a user swiping her finger along an input area on a touchscreen of the electronic device in a left-to-right direction, thereby causing an emoticon library to be displayed on the electronic device in the step 1310. Next, in the step 1315, the electronic device receives a selection input, such as by a user tapping her finger on an emoticon in the emoticon library to select the emoticon. In the step 1320, the selected emoticon is inserted into the text message. In the step 1325, the electronic device receives a "library close" user input, such as by the user swiping her finger in a right-to-left direction, thereby causing the emoticon library to close in the step 1330. The process then loops back to the step 1305 to await another "library open" user input.

It will be appreciated that the steps 1300 are merely illustrative of one embodiment of the invention. In other embodiments, other steps are added, some steps are deleted, and some steps are combined, to name only a few modifications.

Hardware Components

Figure 14:
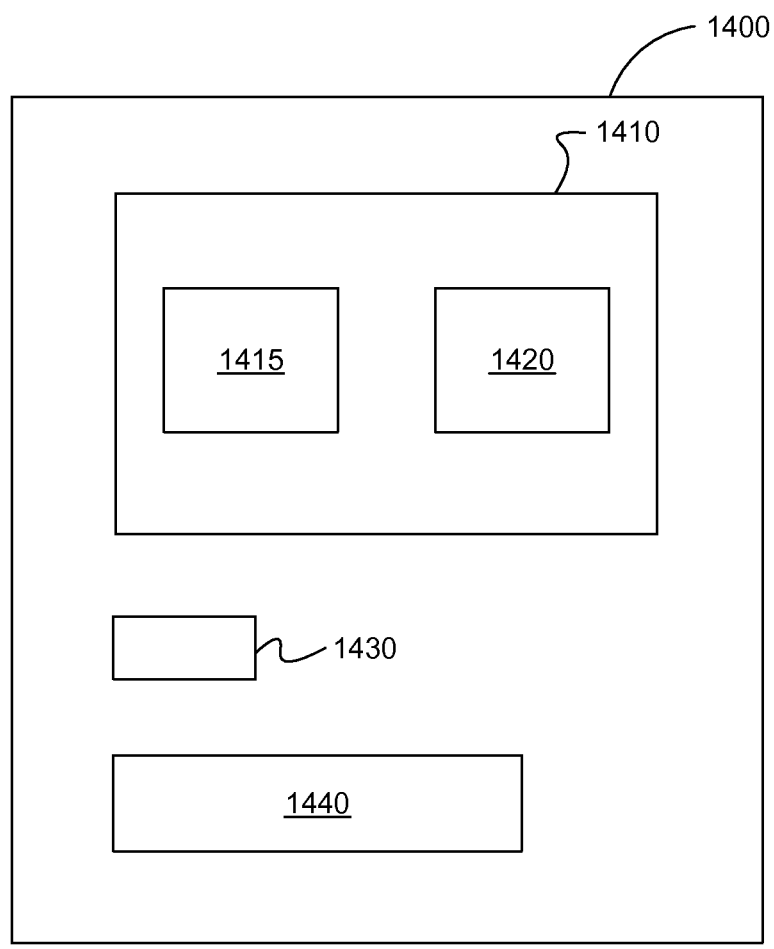
FIG. 14 is a block diagram of an electronic device configured to present an emoticon library to a user during a chat session on the electronic device and insert a selected emoticon from the emoticon library into the chat session in accordance with one embodiment of the invention.

FIG. 14 is a block diagram of an electronic device 1400 in accordance with one embodiment of the invention. Preferably the electronic device 1400 has a touchscreen for displaying data and receiving user inputs (e.g., swiping or tapping). The system 1400 includes a memory 1410 containing one or more emoticon libraries 1415 (e.g., the stored representation of the element 250 in FIG. 4A) and a computer-readable medium 1420 containing computer-executable instructions, a processor 1430, and a user input area 1440 on the touchscreen. In one embodiment, the computer-executable instructions, when executed by the processor 1430, perform the steps 1300. In other embodiments functionally equivalent steps are performed.

The electronic device 1400 is able to be any electronic device. In one embodiment, the electronic device 1400 is a smartphone. In other embodiments, the electronic device 1400 is a mobile phone, a personal computer, a laptop computer, a tablet, a desktop computer, a personal digital assistant, an iPad®, a smart watch, smart glasses, such as Google® glasses, or any other mobile or handheld device, to name only a few such devices.

Figure 15:
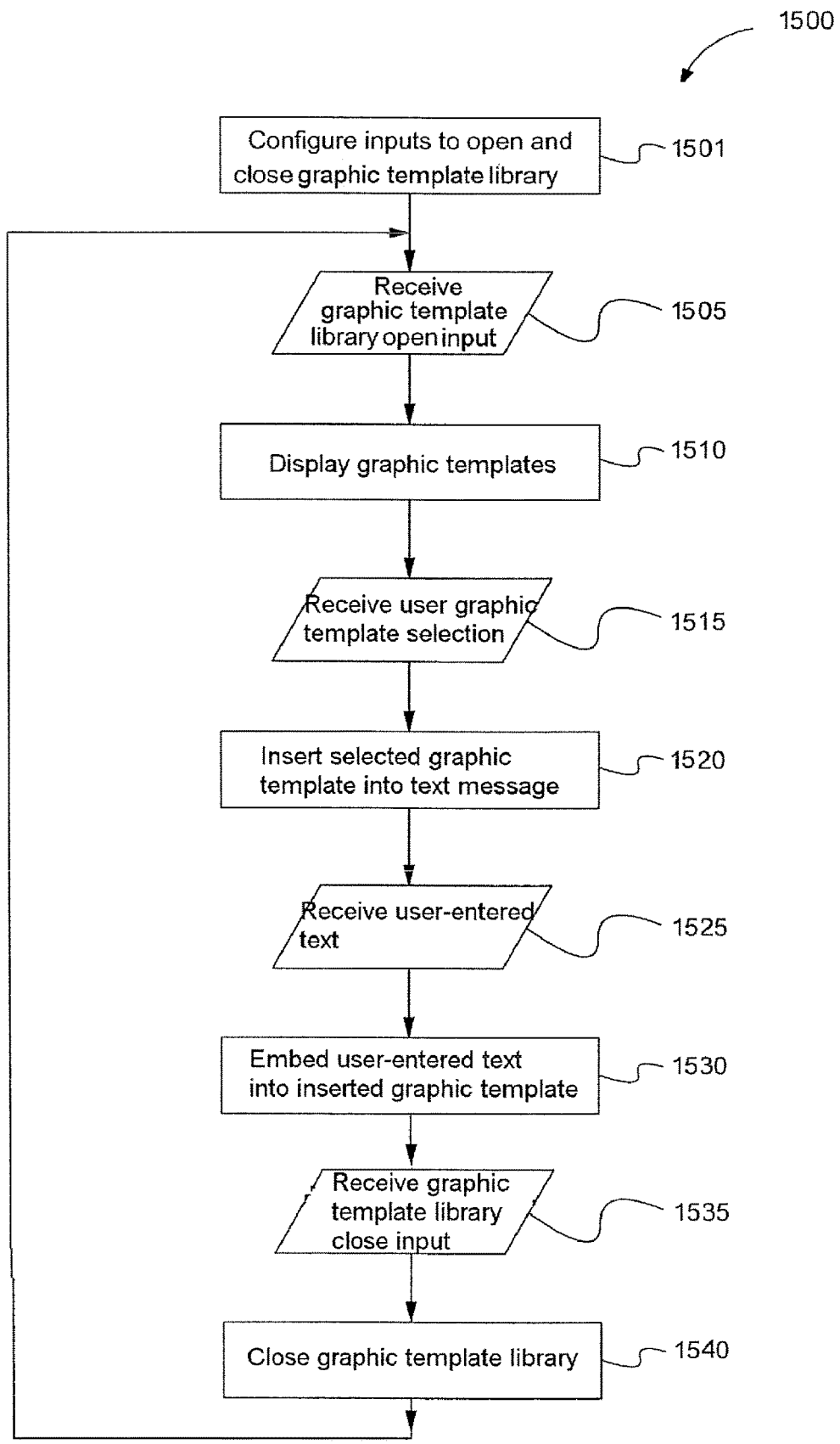
FIG. 15 shows the steps of a process for inserting a graphic, including embedded user-entered text, into text messages during a chat session in accordance with one embodiment of the invention.

FIG. 15 shows the steps 1500 of a process for inserting a graphic, including embedded user-entered text, into text message during a chat session executing on an electronic device in accordance with one embodiment of the invention. In the step 1501, the electronic device is configured, such as by checking and unchecking boxes as in the configuration screen 1200. Next, in the step 1505, the electronic device receives a "graphic template library open" user input (e.g., gesture), such as by a user swiping her finger along an input area on a touchscreen of the electronic device in a left-to-right direction, thereby causing a graphic template library to be displayed on the electronic device in the step 1510. Next, in the step 1515, the electronic device receives a selection input, such as by a user tapping her finger on a graphic template in the graphic template library to select the graphic template. In the step 1520, the selected graphic template is inserted into the text message. In step 1525 the electronic device receives text entered by a user. Next, in step 1530, the electronic device embeds the user-entered text into the inserted graphic template in the text message. In the step 1535, the electronic device receives a "graphic template library close" user input, such as by the user swiping her finger in a right-to-left direction, thereby causing the graphic template library to close in the step 1540. The process then loops back to the step 1505 to await another "graphic template library open" user input.

It will be appreciated that steps 1500 are merely illustrative of one embodiment of the invention. In other embodiments, other steps are added, some steps are deleted, and some steps are combined, to name on a few modification.

It will be appreciated that while the examples above describe inserting emoticons into text messages, other graphical images are able to be inserted into text messages in accordance with the principles of the invention.

While the examples describe different embodiments, it will be appreciated that the embodiments are able to be combined in any combination of ways. For example, an electronic device in accordance with the invention is able to present emoticons, or present a list of items to add to a chat, or add mood messages, or perform all of these functions, or perform any subset of these functions.

The present invention has been described above with reference to exemplary embodiments. It will be apparent to those skilled in the art that various modifications may be made to the embodiments without departing from the spirit and scope of the invention as defined by the appended claims.

The invention claimed is:

1. A method of inserting a mood message into a text message during a chat session on a mobile electronic device, the method comprising:
   receiving from a user, a swipe in a left-to-right direction along an input area of a touchscreen of the mobile electronic device;
   presenting, by an embedded widget, a plurality of mood message templates on the touchscreen, in response to the swipe and as a suggestion based on the text message typed by the user, each mood message template including a graphic design having a portion dedicated for receiving text, wherein the plurality of mood message templates is presented to the user during the chat session without leaving the chat session;
   in response to a tapping on an icon of the mood message template by the user, inserting a selected mood message template into the text message;
   embedding text entered by the user within the portion of the graphic design dedicated for receiving the text; and
   in response to a user input from the user, presenting a first pane that includes a set of rich media options to select at least one of a photo, a video, or a push-to-talk link, wherein selecting one of the set of rich media options causes a selected option to be embedded within the chat session.

2. The method of claim 1, further comprising presenting a touchscreen keyboard for receiving the tapping of the icon.

3. The method of claim 2, wherein after receiving the swipe, the plurality of templates is presented in a second pane that overlays partially or totally the touchscreen keyboard.

4. The method of claim 1, further comprising presenting at least an other mood message template in response to the user navigating to other mood message templates, wherein text entered by the user is embedded within the other mood message template.

5. The method of claim 1, wherein the mood message template includes at least one of static media, animated media, an image, or a video.

6. The method of claim 1, further comprising:
   after the presenting, receiving from the user, a swipe in a right-to-left direction along the input area of the touchscreen of the mobile electronic device; and
   closing, by the embedded widget, the plurality of mood message templates on the touchscreen.

7. The method of claim 1, wherein the presenting of the plurality of mood message templates is performed before receiving from the user the text for embedding into the portion of the graphic design dedicated for receiving text.

8. The method of claim 1, wherein the presenting of the plurality of mood message templates is performed after receiving from the user the text for embedding into the portion of the graphic design dedicated for receiving the text.

9. The method of claim 1, wherein the mobile electronic device is a smartphone.

10. The method of claim 1, wherein the selected mood message template is a banner that includes the text.

11. A mobile electronic device comprising:
    a processor;
    a touchscreen for displaying information to a user and receiving user inputs; and
    a memory storing:
      a plurality of mood message templates, each mood message template including a graphic design having a portion dedicated for receiving text; and
      a computer readable program comprising instructions that, when executed during a chat session, cause the processor to execute operations for inserting a mood message into a text message, the operations comprising:
        receiving from the user, a swipe in a left-to-right direction along an input area of the touchscreen;
        presenting, by an embedded widget, the plurality of mood message templates on the touchscreen, in response to the swipe and as a suggestion based on the text typed by the user, wherein the plurality of mood message templates is presented to the user during the chat session without leaving the chat session;
        in response to tapping on an icon of the mood message template by the user, inserting a selected mood message template into the text message, upon selection of one of the mood message templates by the user;
        embedding text entered by the user within the portion of the graphic design dedicated for receiving the text; and
        in response to a user input from the user, presenting a first pane that includes a set of rich media options to select at least one of a photo, a video, or a push-to-talk link, wherein selecting one of the set of rich media options causes a selected option to be embedded within the chat session.

12. The mobile electronic device of claim 11, wherein the operations further comprise presenting a touchscreen keyboard for receiving the tapping of the icon.

13. The mobile electronic device of claim 12, wherein after receiving the swipe, the plurality of templates is presented in a second pane that overlays partially or totally the touchscreen keyboard.

14. The mobile electronic device of claim 11, wherein the operations further comprise presenting at least an other mood message template in response to the user navigating to other mood message templates, wherein text entered by the user is embedded within the other mood message template.

15. The mobile electronic device of claim 11, wherein the icon is displayed by the touchscreen.

16. The mobile electronic device of claim 11, wherein the operations further include:

receiving from the user, a swipe in a right-to-left direction along the input area of the touchscreen of the mobile electronic device; and closing, by the embedded widget, the plurality of mood message templates on the touchscreen.

17. The mobile electronic device of claim 11, wherein the presenting of the plurality of mood message templates is performed before receiving from the user the text for embedding into the portion of the graphic design dedicated for receiving the text.

18. The mobile electronic device of claim 11, wherein the presenting of the plurality of mood message templates is performed after receiving from the user the text for embedding into the portion of the graphic design dedicated for receiving the text.

19. The mobile electronic device of claim 11, wherein the mobile electronic device is a smartphone.

20. The mobile electronic device of claim 11, wherein the selected mood message template is a banner that includes the text.

* * * * *